(12) United States Patent
Li et al.

(10) Patent No.: US 11,368,608 B2
(45) Date of Patent: Jun. 21, 2022

(54) COMPRESSED SENSING BASED OBJECT IMAGING SYSTEM AND IMAGING METHOD THEREFOR

(71) Applicant: SOUTH CHINA NORMAL UNIVERSITY, Guangzhou (CN)

(72) Inventors: Jun Li, Guangzhou (CN); Miao Lei, Shenzhen (CN); Xiaofang Dai, Guangzhou (CN); Shangyuan Wang, Guangzhou (CN); Ting Zhong, Guangzhou (CN); Chuangxue Liang, Guangzhou (CN); Chen Wang, Nanjing (CN); Ping Xie, Guangzhou (CN); Ruiqiang Wang, Guangzhou (CN)

(73) Assignee: SOUTH CHINA NORMAL UNIVERSITY, Guangzhou (CN)

( * ) Notice: Subject to any disclaimer, the term of this patent is extended or adjusted under 35 U.S.C. 154(b) by 413 days.

(21) Appl. No.: 16/618,376

(22) PCT Filed: Jan. 18, 2018

(86) PCT No.: PCT/CN2018/073172
§ 371 (c)(1),
(2) Date: Dec. 1, 2019

(87) PCT Pub. No.: WO2018/218974
PCT Pub. Date: Dec. 6, 2018

(65) Prior Publication Data
US 2021/0144278 A1    May 13, 2021

(30) Foreign Application Priority Data

Jun. 1, 2017   (CN) .......................... 201710402262.4

(51) Int. Cl.
  *H04N 5/225*       (2006.01)
  *G02B 5/30*        (2006.01)
  *G06F 17/16*       (2006.01)

(52) U.S. Cl.
  CPC ......... *H04N 5/2254* (2013.01); *G02B 5/3033* (2013.01); *G06F 17/16* (2013.01)

(58) Field of Classification Search
  CPC ........ G01V 8/10; G02B 5/3033; G06F 17/16; G06T 7/0002; H04N 5/2254; H04N 5/2256
  See application file for complete search history.

(56) References Cited

U.S. PATENT DOCUMENTS 7,616,320 B2 * 11/2009 Javidi .................. G06V 20/693
                                                             356/457
2016/0313548 A1 * 10/2016 Fujii .................... H04N 13/218
(Continued)

FOREIGN PATENT DOCUMENTS

CN           102389321       3/2012
CN           102393911       3/2012
(Continued)

*Primary Examiner* — Amy R Hsu
(74) *Attorney, Agent, or Firm* — JMB Davis Ben-David

(57) ABSTRACT

A compressed sensing based object imaging system and an imaging method thereof. The object imaging system comprises a light source generation unit (11), a filter unit (12), an image generation unit (13), an image acquisition unit (14), and an image reconstruction unit (15). The light source generation unit (11) generates experimental laser; the filter unit (12) filters high frequency scattered light and forms parallel light; the image generation unit (13) generates an experimental image in which an object image (16) and a specific measurement matrix (17) are superimposed; the image acquisition unit (14) performs compression sampling on the generated experimental image; and the image reconstruction unit (15) reconstructs sampling data to restore the (Continued)

object image (16). The imaging method comprises: establishing a sample database comprising the specific target object image (16); training sample images to obtain the specific measurement matrix (17); and simultaneously completing image sampling, image compression and image recognition in an all-optical system. The system and the method can greatly reduce the data volume recorded in image recognition and image matching, thus improving the real-time performance of the system, and providing a possibility of concurrent processing by machine vision and artificial intelligence.

11 Claims, 2 Drawing Sheets

(56) References Cited

U.S. PATENT DOCUMENTS

| | | | |
|---|---|---|---|
| 2018/0052050 A1* | 2/2018 | Menon | H04N 5/2254 |
| 2019/0109973 A1* | 4/2019 | Riza | G03B 17/17 |

FOREIGN PATENT DOCUMENTS

| | | | | |
|---|---|---|---|---|
| CN | 104021522 | | 9/2014 | |
| CN | 204360096 | | 5/2015 | |
| CN | 105451024 | | 3/2016 | |
| CN | 106331442 A * | | 1/2017 | A61B 5/0042 |
| CN | 107121709 | | 9/2017 | |
| CN | 206930789 | | 1/2018 | |
| WO | WO-2010011953 A1 * | | 1/2010 | G01N 1/30 |
| WO | WO-2017169656 A1 * | | 10/2017 | H04N 5/2254 |

* cited by examiner (a)   (b)   (c)   (d)

COMPRESSED SENSING BASED OBJECT IMAGING SYSTEM AND IMAGING METHOD THEREFOR

CROSS-REFERENCE TO RELATED APPLICATIONS

This is the U.S. National Stage of International Patent Application No. PCT/CN2018/073172 filed Jan. 18, 2018, which was published in Chinese under PCT Article 21(2), and which in turn claims the benefit of Chinese Patent Application No. 201710402262.4 filed on Jun. 1, 2017.

TECHNICAL FIELD

The present invention relates to the technical field of image imaging and target recognition, and in particular to a compressed sensing based object imaging system and an imaging method therefor.

BACKGROUND ART

In recent years, target recognition, which well integrates technologies in subjects such as pattern recognition, computer vision, and artificial intelligence, has become a very hot topic in the field of visual researches and has a broad application prospect. Since the target recognition method was proposed, many experts and researchers have carried out researches on related work. However, most target recognition methods involve corresponding processing of an image by using a recognition technology after the image is obtained, which causes a poor real-time performance of the system, and thus an accompanying problem of a large volume of image data which also becomes a bottleneck restricting the development of the target recognition methods.

With the rapid development of imaging and information technologies, people also have an increasing demand for electronic products and digital information in daily life. However, limited by the speed of information transmission and the speed of information processing, it is not feasible to increase the sampling rate of information at all costs in order to obtain high-quality data. Under the premise of ensuring that the quality provided by the information is basically unchanged, it is imperative to obtain information of similar quality by using a small amount of sampling.

In the newly emerging theory of compressed sensing, a non-adaptive linear projection value of a signal is acquired at a rate much lower than the Nyquist sampling rate, and then the original signal is accurately reconstructed by solving an optimization problem, which can greatly reduce the volume of data acquired by the system. A series of compressed sensing based target recognition solutions have been proposed gradually. However, although these solutions reduce the volume of data acquired by the system, cumbersome image information still exists during further image recognition and processing in a later stage, which is not conducive to image recognition. In addition, most of these solutions are implemented by way of digital signals in the electrical field, without making full use of the advantages of concurrent processing.

SUMMARY OF THE INVENTION

The main object of the present invention is to overcome the disadvantages and shortcomings in the prior art, and to provide a compressed sensing based object imaging system, which can simultaneously implement image compression, image sampling, and image recognition in a pure optical domain, thereby greatly reducing the volume of data recorded in image recognition and image matching, solving a problem of storage and transmission of massive data, improving the real-time performance of the system, and providing a possibility of concurrent processing by machine vision and artificial intelligence.

Another object of the present invention is to provide an imaging method based on the system above.

The objects of the present invention are implemented by using the following technical solution:

a compressed sensing based object imaging system, comprising a light source generation unit, a filter unit, an image generation unit, an image acquisition unit, and an image reconstruction unit that are sequentially connected, wherein the light source generation unit generates experimental laser light;

the filter unit controls the attenuation of the light intensity of the laser light, filters off high frequency scattered light, and forms a zero-order diffraction spot, and then controls the diffraction spot to form parallel light;

the image generation unit generates an experimental image in which an object image and a specific measurement matrix are superimposed;

the image acquisition unit performs compressed sampling on the experimental image; and the image reconstruction unit reconstructs sampling data to restore the object image.

Preferably, the light source generation unit comprises a laser and a mirror that can reflect laser light to change a propagation direction thereof.

Preferably, the filter unit comprises a circular tunable attenuator, a pinhole filter, and a Fourier lens that are sequentially arranged in parallel with an optical path.

Preferably, the image generation unit comprises a first polarizing film, a spatial light modulator loaded with the specific measurement matrix, and a second polarizing film that are sequentially arranged in parallel with an optical path.

Preferably, the image acquisition unit comprises a convergent lens and a single photon detector that are sequentially arranged in parallel with an optical path.

Preferably, the image reconstruction unit comprises a computer.

An imaging method based on the system above comprises the following steps:

step S1: emitting experimental laser light by using a laser light source;

step S2: performing attenuation processing on the experimental laser light, filtering off high frequency scattered light to obtain a zero-order diffraction spot, and adjusting the diffraction spot to be parallel light;

step S3: illuminating an object image with the parallel light, and generating, through a spatial light modulator loaded with a specific measurement matrix, an experimental image in which the object image and the specific measurement matrix are superimposed; and step S4: performing compressed sampling on the experimental image, such that an image reconstruction unit reconstructs the object image according to sampling data.

Preferably, a calculation method for the specific measurement matrix in step S3 is: establishing a sample library comprising the specific target object image, and training sample images by using a principal component analysis method to obtain the specific measurement matrix.

Specifically, according to the principal component analysis method, provided that there is a set of N image training samples X each having a size of p×q pixels, each sample has a vector $X_i$ that is formed by a pixel grayscale value thereof, and the set of training samples constituted by vectors is $X=\{X_1, X_2, \ldots, X_i, \ldots, X_N\}$, the mean of the set of training samples is first calculated:

$$\overline{X} = \frac{1}{N}\sum_{i=1}^{N} X_i,$$

data is further centralized:

$$\hat{X}_i = X_i - \overline{X},$$

a covariance matrix is calculated for the centralized data:

$$R = \frac{1}{N}\sum_{i=1}^{N}(X_i - \overline{X})(X_i - \overline{X})^T$$

eigenvalues $\lambda_i$ of the covariance matrix R are arranged in a descending order, and eigenvectors $u_i$ corresponding to the first m eigenvalues are formed into a principal component matrix U, $$U=[u_1, u_2, \ldots, u_m]$$

wherein the m components extract features that represent main information of the images; and the principal component matrix is subjected to rank inversion to form the specific measurement matrix, and according to the principle of compressed sensing, the specific measurement matrix after training with the sample library is expressed as:

$$\Phi = U^T = [\varphi_1, \varphi_2, \ldots, \varphi_m]^T (\varphi_i = u_i).$$

Preferably, acquiring experimental measurement data in step S4 comprises: acquiring an optical signal at a single point and converting the optical signal into an electrical signal, with an output voltage value being expressed as:

$$y_n = \varphi_n x,$$

where $x \in R^{p \times q}$, x representing the object image, $\varphi_n \in R^{p \times q}$, $n \in \{1, 2, \ldots, m\}$, $\varphi_n$ representing an $n^{th}$ dimension of the specific measurement matrix, which implements an $n^{th}$ measurement of the object image x; and repeating this process m times, such that a measured value Y can be obtained:

$$Y = [y_1, y_2, \ldots, y_m]^T = [\varphi_1, \varphi_2 \ldots \varphi_m]^T x = \Phi x,$$

where $\Phi \in R^{m \times (p \times q)}$ is the specific measurement matrix, and $Y \in R^{m \times 1}$ is the measured value.

Preferably, in step S4, the image reconstruction unit comprises a data screening processing module and an image reconstruction processing module, the data screening processing module is used to perform time domain screening and size screening on data acquired by an image acquisition unit, so as to obtain accurate experimental data; and the image reconstruction processing module reconstructs the object image by using a minimum total variation optimization algorithm.

Compared with the prior art, the present invention has the advantages and beneficial effects as follows.

In the present invention, the imaging of a specific target object is completed in a complex scene by training a specific measurement matrix comprising specific object information by using a machine learning method (i.e., a principal component method) and in connection with a compressed sensing technology. Compared with the prior art, the present invention simultaneously implements image compression, image sampling, and image recognition in an all-optical environment by combining the emerging compressed sensing theory and pattern recognition technologies, that is, implementing target recognition at the time of imaging. This technology greatly reduces the volume of data for storage and transmission, greatly improves the efficiency of target recognition, and provides a possibility of concurrent processing by machine vision and artificial intelligence.

DETAILED DESCRIPTION OF EMBODIMENTS

The present invention will be further described in detail below in connection with embodiments and the accompanying drawings, but the embodiments of the present invention are not limited thereto.

Figure 1:
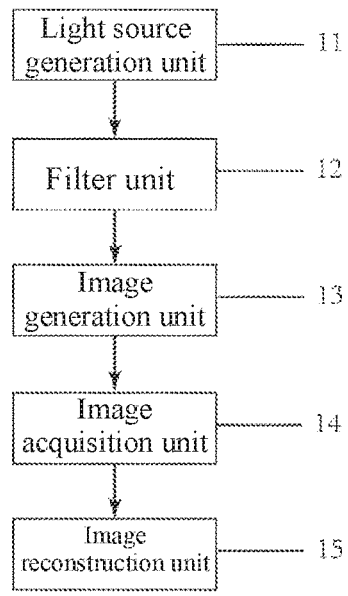
FIG. 1 is a principal block diagram of a compressed sensing based object imaging system in the embodiment.
Figure 2:
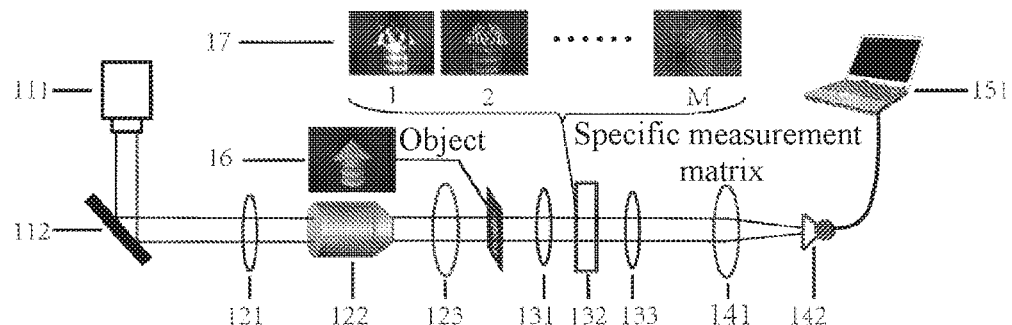
FIG. 2 is a schematic structural diagram of a compressed sensing based object imaging system in the embodiment.

A compressed sensing based object imaging system, as shown in FIGS. 1 and 2, comprises a light source generation unit 11, a filter unit 12, an image generation unit 13, an image acquisition unit 14, and an image reconstruction unit 15.

The light source generation unit 11 is used to generate experimental laser light. The filter unit 12 is used to attenuate the experimental laser light, filter off high frequency scattered light to obtain a zero-order diffraction spot, and adjust the diffraction spot to be parallel light. The image generation unit 13 is used to generate an experimental image in which an object image 16 and a specific measurement matrix 17 after training are superimposed. The image acquisition unit 14 is used to acquire experimental data and transmit the experimental data to the image reconstruction unit 15. The image reconstruction unit 15 is used to reconstruct the object image 16 according to screened data.

The light source generation unit 11 comprises a helium-neon laser 111 and a reinforced aluminum mirror 112. The helium-neon laser 111 emits a laser light beam, and the laser light beam is reflected by the reinforced aluminum mirror 112 to change a propagation direction of the laser light beam.

The filter unit 12 comprises a circular tunable attenuator 121, a pinhole filter 122, and a Fourier lens 123. The circular tunable attenuator 121 controls the attenuation of the light intensity of the laser light, and the high frequency scattered light is filtered off from the attenuated laser by means of the pinhole filter 122; and a zero-order diffraction spot is formed by passing unscattered zero-order light through pinholes, and then parallel light is formed by passing the diffraction spot through the Fourier lens 123.

The image generation unit 13 comprises a first polarizing film 131, a spatial light modulator 132, and a second polarizing film 133. The object image 16 is illuminated with the experimental light transmitted by the filter unit 12, the spatial light modulator 132 is loaded with the specific measurement matrix 17, and the object image 16 and the specific measurement matrix 17 are superimposed; and the first polarizing film 131 and the second polarizing film 133 are respectively arranged in front of and behind the spatial light modulator 132, so that the first polarizing film and the second polarizing film are in a pure amplitude state.

The image acquisition unit 14 comprises a convergent lens 141 and a single photon detector 142. The convergent lens 141 converges the experimental image data of the image generation unit 13 at one point, and then the single photon detector 142 acquires an optical signal at the single point and converts the optical signal into an electrical signal.

The reconstruction unit 15 comprises a computer 151. The computer 151 is used to screen experimental data and reconstruct the object image 16 by using a minimum total variation optimization algorithm.

The steps of compression holographic imaging of the system are specifically described as follows:

Step S1: laser light emitted by a light source is reflected to change a propagation optical path of the laser light.

Specifically, a laser light beam is emitted by the helium-neon laser 111. The laser light is reflected by the reinforced aluminum mirror 112 to change the propagation direction of the laser light.

Step S2: attenuation processing is performed on the experimental laser light, high frequency scattered light is filtered off therefrom to obtain a zero-order diffraction spot, and the diffraction spot is adjusted to be parallel light.

Specifically, the circular tunable attenuator 121 is arranged along the optical path to control the attenuation of the light intensity of the laser light; the pinhole filter 122 is arranged behind the circular tunable attenuator 121; the high frequency scattered light is filtered off by means of the pinhole filter 122 to obtain a zero-order diffraction spot; and the Fourier lens 123 is arranged behind the pinhole filter 122, and parallel light is formed by passing the diffraction spot through the Fourier lens 123.

Step S3: the object image 16 is illuminated with the parallel light, and an experimental image in which the object image and the measurement matrix are superimposed is generated.

Specifically, the object image 16 is illuminated with the experimental light transmitted by the filter unit 12; the spatial light modulator 132 is loaded with the specific measurement matrix 17, and transmission light of the object image 16 is superimposed with the specific measurement matrix 17. The first polarizing film 131 and the second polarizing film 133 are respectively arranged in front of and behind the spatial light modulator 132, so that the first polarizing film and the second polarizing film are in the pure amplitude state.

In step S3, according to the principal component analysis method, provided that there is a set of N image training samples X each having a size of p×q pixels, each sample has a vector $X_i$ that is formed by a pixel grayscale value thereof, and the set of training samples constituted by vectors is $X=\{X_1, X_2, \ldots, X_N\}$, the mean of the set of training samples is first calculated:

$$\overline{X} = \frac{1}{N}\sum_{i=1}^{N} X_i,$$

data is further centralized:

$$\hat{X}_i = X_i - \overline{X},$$

a covariance matrix is calculated for the centralized data:

$$R = \frac{1}{N}\sum_{i=1}^{N} (X_i - \overline{X})(X_i - \overline{X})^T$$

eigenvalues $\lambda_i$ of the covariance matrix R are arranged in a descending order, a larger eigenvalue $\lambda_i$ indicates a stronger capability to represent image information, and therefore, eigenvectors $u_i$ corresponding to the first m eigenvalues are formed into a principal component matrix U:

$$U=[u_1, u_2, \ldots, u_m]$$

wherein the m components extract features that represent main information of images; and the principal component matrix is subjected to rank inversion to form the specific measurement matrix 17. Since the specific measurement matrix 17 comprises information of the specific target object image 16, it is possible to image only a specific target in a complex scene while ignoring background images unrelated to the target image.

According to the principle of compressed sensing, the specific measurement matrix 17 after training with the sample library is expressed as:

$$\Phi=U^T=[\phi_1, \phi_2, \ldots, \phi_m]^T (\phi_i=u_i)$$

Step S4: compressed sampling is performed on the generated experimental image, and the object image is reconstructed according to the data.

An output voltage of a high-sensitivity photodiode of the single photon detector 142 is expressed as:

$$y_n=\phi_n x,$$

where $x \in R^{p \times q}$, x representing the object image, $\phi_n \in R^{p \times q}$, $n \in \{1, 2, \ldots, m\}$, $\phi_n$ representing an $n^{th}$ dimension of the specific measurement matrix, which implements an $n^{th}$ measurement of the object image x; and repeating this process m times, such that a measured value Y can be obtained:

$$Y=[y_1, y_2, \ldots, y_m]^T=[\phi_1, \phi_2, \ldots \phi_m]^T x=\Phi x,$$

where $\Phi \in R^{m \times (p \times q)}$ is the specific measurement matrix after training with the sample library, and $Y \in R^{m \times 1}$ is the measured value.

Accurate experimental data is obtained by means of time domain screening and size screening. The object image is further reconstructed by using the minimum total variation optimization algorithm.

Figure 3:
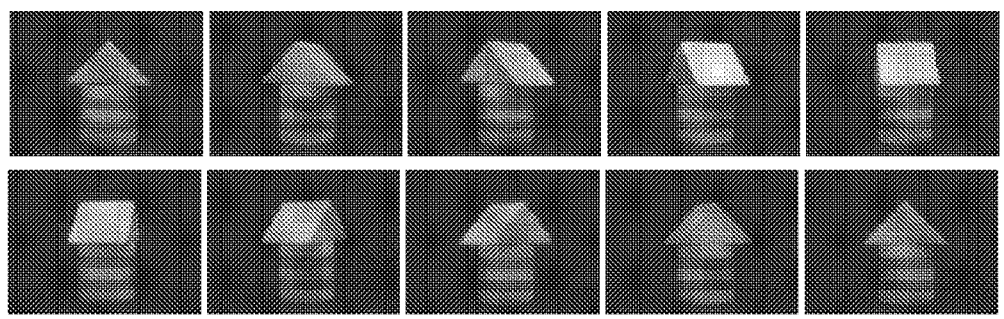
FIG. 3 shows some images of a set of training sample libraries established in the embodiment.

FIG. 3 shows some images of a set of training sample libraries. The set of training sample libraries are obtained by capturing images of the same object at different angles, i.e. having 360 images in total and a size of 800×600 pixels. The specific establishment process is as follows: placing a training object on a circular rotary table with a black background, and capturing images at a fixed position by an AVT camera. From 0 to 359 degrees, capturing is performed once in a gray mode for each rotation of one degree, and a total of 360 training sample images at different angles are obtained. The images shown in FIG. 3 are images sequentially captured at 0, 20, 40, . . . , 180 degrees.

Figure 4:
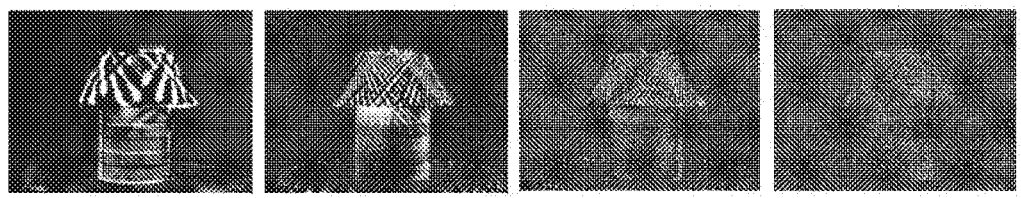
FIG. 4 shows images of a specific measurement matrix after training with sample libraries in the embodiment.

FIG. 4 shows images of a specific measurement matrix after training with the sample library. Images respectively generated from data of the first, $101^{st}$, $201^{st}$, and $301^{st}$ rows of the specific measurement matrix are shown in the figure, and since a principal component analysis method is used, images corresponding to a smaller row number have richer information and a higher pixel value than images corresponding to a larger row number.

Figure 5:
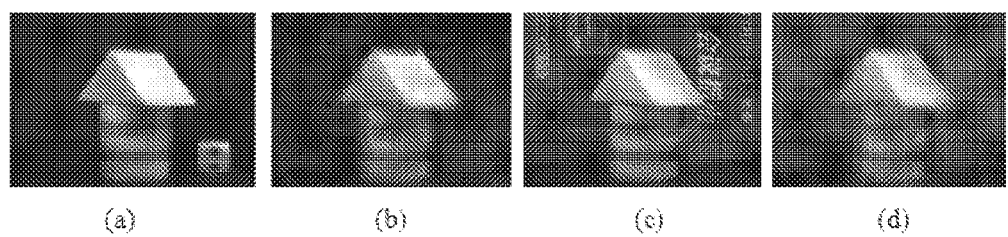
FIG. 5 is a diagram showing simulation experiment results for a compressed sensing based object imaging method in the embodiment.

FIG. 5 is a diagram showing simulation experiment results for a compressed sensing based object imaging method. Images with background interferents that are captured by the AVT camera are respectively as shown in FIGS. 5(a) and 5(c), and all have a size of 800×600 pixels. Compressed sampling is performed on the images by using the specific measurement matrix after training, and the images are reconstructed by using a minimum total variation optimization algorithm. FIG. 5(b) shows a result of reconstructing FIG. 5(a) by using only 0.075% of measurement data. FIG. 5(d) shows a result of reconstructing FIG. 5(c) by using only 0.075% of measurement data. The simulation experiment results show that the method can better remove interfering background in an image, but only image a specific object, which verifies that the proposed compressed sensing based object imaging system is feasible.

Compared with the prior art, the present invention simultaneously implements compressed sampling and image recognition in an all-optical environment by combining the emerging compressed sensing theory and pattern recognition technologies, thereby greatly reducing the volume of data for storage and transmission, greatly improving the efficiency of target recognition, and satisfying requirements for imaging of a compressed object.

The above-described embodiments are preferred embodiments of the present invention; however, the embodiments of the present invention are not limited to the above-described embodiments, and any other change, modification, replacement, combination, and simplification made without departing from the spirit, essence, and principle of the present invention should be an equivalent replacement and should be included within the scope of protection of the present invention.

The invention claimed is:

1. A compressed sensing based object imaging system, comprising a light source generation unit, a filter unit, an image generation unit, an image acquisition unit, and an image reconstruction unit that are sequentially connected,
   wherein the light source generation unit generates experimental laser light;
   the filter unit controls the attenuation of the light intensity of the laser light, filters off high frequency scattered light, and forms a zero-order diffraction spot, and then controls the diffraction spot to form parallel light;
   the image generation unit generates an experimental image in which an object image and a specific measurement matrix are superimposed;
   the image acquisition unit performs compressed sampling on the experimental image; and
   the image reconstruction unit reconstructs sampling data to restore the object image.

2. The compressed sensing based object imaging system according to claim 1, wherein the light source generation unit comprises a laser and a mirror that can reflect laser light to change a propagation direction thereof.

3. The compressed sensing based object imaging system according to claim 1, wherein the filter unit comprises a circular tunable attenuator, a pinhole filter, and a Fourier lens that are sequentially arranged in parallel with an optical path.

4. The compressed sensing based object imaging system according to claim 1, wherein the image generation unit comprises a first polarizing film, a spatial light modulator loaded with the specific measurement matrix, and a second polarizing film that are sequentially arranged in parallel with an optical path.

5. The compressed sensing based object imaging system according to claim 1, wherein the image acquisition unit comprises a convergent lens and a single photon detector that are sequentially arranged in parallel with an optical path.

6. The compressed sensing based object imaging system according to claim 1, wherein the image reconstruction unit comprises a computer.

7. An imaging method based on the system of claim 1, comprising the following steps:
   step S1: emitting experimental laser light by using a laser light source;
   step S2: performing attenuation processing on the experimental laser light, filtering off high frequency scattered light to obtain a zero-order diffraction spot, and adjusting the diffraction spot to be parallel light;
   step S3: illuminating an object image with the parallel light, and generating, through a spatial light modulator loaded with a specific measurement matrix, an experimental image in which the object image and the specific measurement matrix are superimposed; and
   step S4: performing compressed sampling on the experimental image, such that an image reconstruction unit reconstructs the object image according to sampling data.

8. The imaging method according to claim 7, wherein a calculation method for the specific measurement matrix in step S3 is: establishing a sample library comprising the specific target object image, and training sample images by using a principal component analysis method to obtain the specific measurement matrix.

9. The imaging method according to claim 8, wherein according to the principal component analysis method, provided that there is a set of N image training samples X each having a size of p×q pixels, each sample has a vector $X_i$ that is formed by a pixel grayscale value thereof, and the set of training samples constituted by vectors is $X=\{X_1, X_2, \ldots, X_i, X_N\}$, the mean of the set of training samples is first calculated:

$$\overline{X} = \frac{1}{N}\sum_{i=1}^{N} X_i,$$

data is further centralized:

$$\hat{X}_i = X_i - \overline{X},$$

a covariance matrix is calculated for the centralized data:

$$R = \frac{1}{N}\sum_{i=1}^{N}(X_i - \overline{X})(X_i - \overline{X})^T$$

eigenvalues $\lambda_i$ of the covariance matrix R are arranged in a descending order, and eigenvectors $u_i$ corresponding to the first m eigenvalues are formed into a principal component matrix U, $$U=[u_1, u_2, \ldots, u_m]$$

wherein the m components extract features that represent main information of the images; and the principal component matrix is subjected to rank inversion to form the specific measurement matrix, and according to the principle of compressed sensing, the specific measurement matrix after training with the sample library is expressed as:

$$\Phi = U^T = [\phi_1, \phi_2, \ldots, \phi_m]^T (\phi_i = u_i).$$

10. The imaging method according to claim 7, wherein acquiring experimental measurement data in step S4 comprises: acquiring an optical signal at a single point and converting the optical signal into an electrical signal, with an output voltage value being expressed as:

$$y_n = \varphi_n x,$$

where $x \in R^{p \times q}$, x representing the object image, $\varphi_n \in R^{p \times q}$, $n \in \{1, 2, \ldots, m\}$, $\varphi_n$ representing an $n^{th}$ dimension of the specific measurement matrix, which implements an $n^{th}$ measurement of the object image x; and repeating this process m times, such that a measured value Y can be obtained:

$$Y = [y_1, y_2, \ldots, y_m]^T = [\varphi_1, \varphi_2, \ldots \varphi_m]^T x = \Phi x,$$

where $\Phi \in R^{m \times (p \times q)}$ is the specific measurement matrix, and $Y \in R^{m \times 1}$ is the measured value.

11. The imaging method according to claim 7, wherein in step S4, the image reconstruction unit comprises a data screening processing module and an image reconstruction processing module, the data screening processing module is used to perform time domain screening and size screening on data acquired by an image acquisition unit, so as to obtain accurate experimental data; and the image reconstruction processing module reconstructs the object image by using a minimum total variation optimization algorithm.

* * * * *